United States Patent [19]
Zhou et al.

[11] Patent Number: 5,930,290
[45] Date of Patent: Jul. 27, 1999

[54] SPREAD SPECTRUM COMMUNICATIONS SYSTEM FOR HIGH-SPEED COMMUNICATIONS

[75] Inventors: Changming Zhou; Guoliang Shou; Xuping Zhou; Makoto Yamamoto; Sunao Takatori; Kenzo Urabe, all of Tokyo, Japan

[73] Assignees: Yozan Inc.; Kokusai Electric, both of Tokyo, Japan

[21] Appl. No.: 08/841,217

[22] Filed: Apr. 30, 1997

[30] Foreign Application Priority Data

Apr. 30, 1996 [JP] Japan .................................. 8-132886

[51] Int. Cl.$^6$ .......................... H04B 15/00; H04B 7/216
[52] U.S. Cl. .......................... 375/200; 375/206; 370/342
[58] Field of Search .................................. 375/200, 202, 375/208, 220, 206, 219, 207; 370/342, 320, 335, 366; 325/219, 220

[56] References Cited

U.S. PATENT DOCUMENTS

| | | | |
|---|---|---|---|
| 5,566,165 | 10/1996 | Sawahashi et al. | 370/242 |
| 5,581,547 | 12/1996 | Umeda et al. | 375/200 |
| 5,717,713 | 2/1998 | Datali | 375/200 |
| 5,748,668 | 5/1998 | Tomita et al. | 375/200 |
| 5,793,794 | 8/1998 | Kato et al. | 375/200 |
| 5,793,798 | 8/1998 | Rudish et al. | 375/206 |
| 5,796,774 | 8/1998 | Kato et al. | 375/206 |

OTHER PUBLICATIONS

"Proposal of Parallel combinary spread spectrum Communication system", B–II vol. J74–B–II No. 5 pp. 207–214 May 1991 J. Zhu et al.

CDMA Principles of Spread Spectrum Communication AJ. Viterbi pp. 97–105.

*Primary Examiner*—Chi H. Pham
*Assistant Examiner*—Khai Tran
*Attorney, Agent, or Firm*—Pillsbury Madison & Sutro LLP

[57] ABSTRACT

A fast spread spectrum communication system is provided, having fewer circuits and requiring fewer PN codes to be assigned to a user. A series of digital data to be transmitted, is divided into 4-bit frames. The 4-bit data of each frame is divided into the first through fourth elements in a predetermined order. The first complex number is constructed by the first and second elements, and the second complex number is determined according to the value of the third and fourth elements. The spectrum of the data to be transmitted is spread by multiplying these complex numbers. Four matched filters despread a received signal by different combinations of PN codes stored in a receiver. The first through fourth elements are recovered according to the outputs of the matched filters.

16 Claims, 10 Drawing Sheets

SPREAD SPECTRUM COMMUNICATIONS SYSTEM FOR HIGH-SPEED COMMUNICATIONS

This invention claims a priority based on patent application 8-132866 filed in Japan, the content of which is incorporated hereinto by reference.

BACKGROUND OF THE INVENTION

1. Field of the Invention

The present invention relates to a spread spectrum communication system for wireless communications, such as mobile communications and wireless LAN systems. Particularly, the present invention relates to a spread spectrum communications system for high-speed communications.

2. Related Art

To achieve higher communication speed using spread spectrum techniques, an M-ary method, a parallel method, and a parallel combination method have been proposed. (See AKECHIKA, Yasuaki, et al., Electronic Information Communication Society Papers, B-II, Vol. J74-B-II, No. 5, pp 207–214, May 1991.) In the M-ary method, a plurality of PN codes are initially prepared. Each PN code corresponds to predetermined bit patterns of a transmitting signal. One PN code is selected and transmitted based on which signal is being transmitted.

In the parallel method, a plurality of PN codes are initially prepared. The data to be transmitted is divided into parallel signals, spread by respective PN codes and transmitted in parallel. The parallel combination method also utilizes a plurality of PN codes. A combination of PN codes is selected based on which of the signals are to be transmitted, and one or a plurality of PN codes are transmitted in parallel.

In such high speed spread spectrum communication methods, the receiver must be able to receive a plurality of PN code sequences simultaneously. Thus, the demodulator needs a plurality of matched filters. Faster speed is desired for a circuit scale. In conventional high speed communication methods, many PN codes must be assigned to one user, even though the number of available PN codes is limited. Therefore, the number of users was limited.

SUMMARY OF THE INVENTION

It is therefore an object of the present invention to provide a spread spectrum communication method, which realizes higher speed communication with a minimum amount of circuitry, without increasing the number of PN codes assigned to each user.

To achieve such an object, the spread spectrum communication system of the present invention has a first communications station having a transmitter and a second communications station having a receiver. The transmitter has first and second PN codes, means for dividing data to be transmitted, into frames having 4 bits, means for separating the 4 bits of the frame into first through fourth elements, and a multiplier unit which spreads a spectrum of the data to be transmitted by multiplying a first complex data unit defined with the first and second elements by a second complex data unit defined with a combination of the first and second PN codes. The combination is defined by the third and fourth elements. A quadrature modulator modulates real and imaginary parts of the multiplied data.

The receiver contains the first and second PN codes. A quadrature detector detects in-phase and quadrature phase parts of a received signal. Matched filters despread an in-phase part and a quadrature phase part of the received signal with the first and second PN codes, respectively.

According to a second aspect of the present invention, the multiplier unit calculates (Ii+jIq)(Cx+jCy) wherein Ii is the value of the first element, Iq is the value of the second element, and (Cx+jCy) is defined by the combination of the first and second PN codes. The quadrature modulator modulates the real and imaginary parts of the multiplied data as in-phase and quadrature phase signals. The matched filters demodulate in-phase and quadrature phase parts of the received signal with all combinations of the first and second PN codes, the number of matched filters being four.

The matched filters may include the first matched filter applying the first PN code to the in-phase part, the second matched filter applying the second PN code to the in-phase part, the third matched filter applying the first PN code to the quadrature phase part and the fourth matched filter applying the second PN code to the quadrature phase part.

DESCRIPTION OF THE PREFERRED EMBODIMENTS

1. First Embodiment

Figure 1:
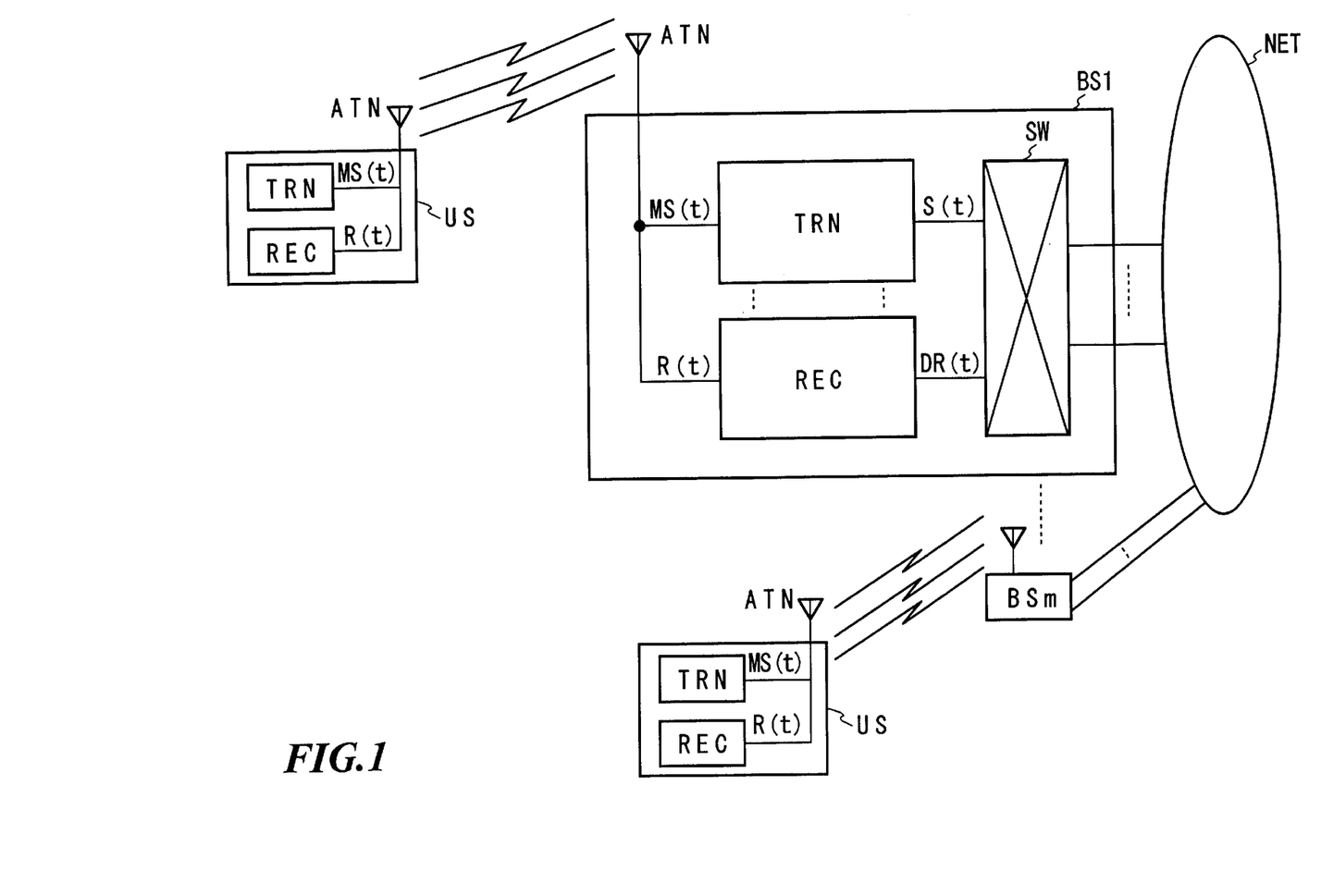
FIG. 1 is a block diagram of a spread spectrum communication system according to the present invention.

FIG. 1 is a block diagram of the spread spectrum communication system according to a first embodiment of the present invention. The base station BS1 sends and receives a signal to and from each user station US using plural PN codes through an antenna ATN. The transmission data S(t) is converted from serial to parallel and modulated, by a transmitter TRN. The modulated signal MS(t) is fed to the antenna ATN for transmission. The signal R(t) received by the antenna ATN is demodulated into parallel data and converted to a serial signal DR(t), by a receiver REC. A switch SW switches the user data to and from a network NET.

The user station US also has an antenna ATN, a transmitter TRN and a receiver REC. They are the same as those of the base station BS1 and their explanations are therefore omitted. Within the specification and claims, a communication station means either base station or user station.

Figure 2:
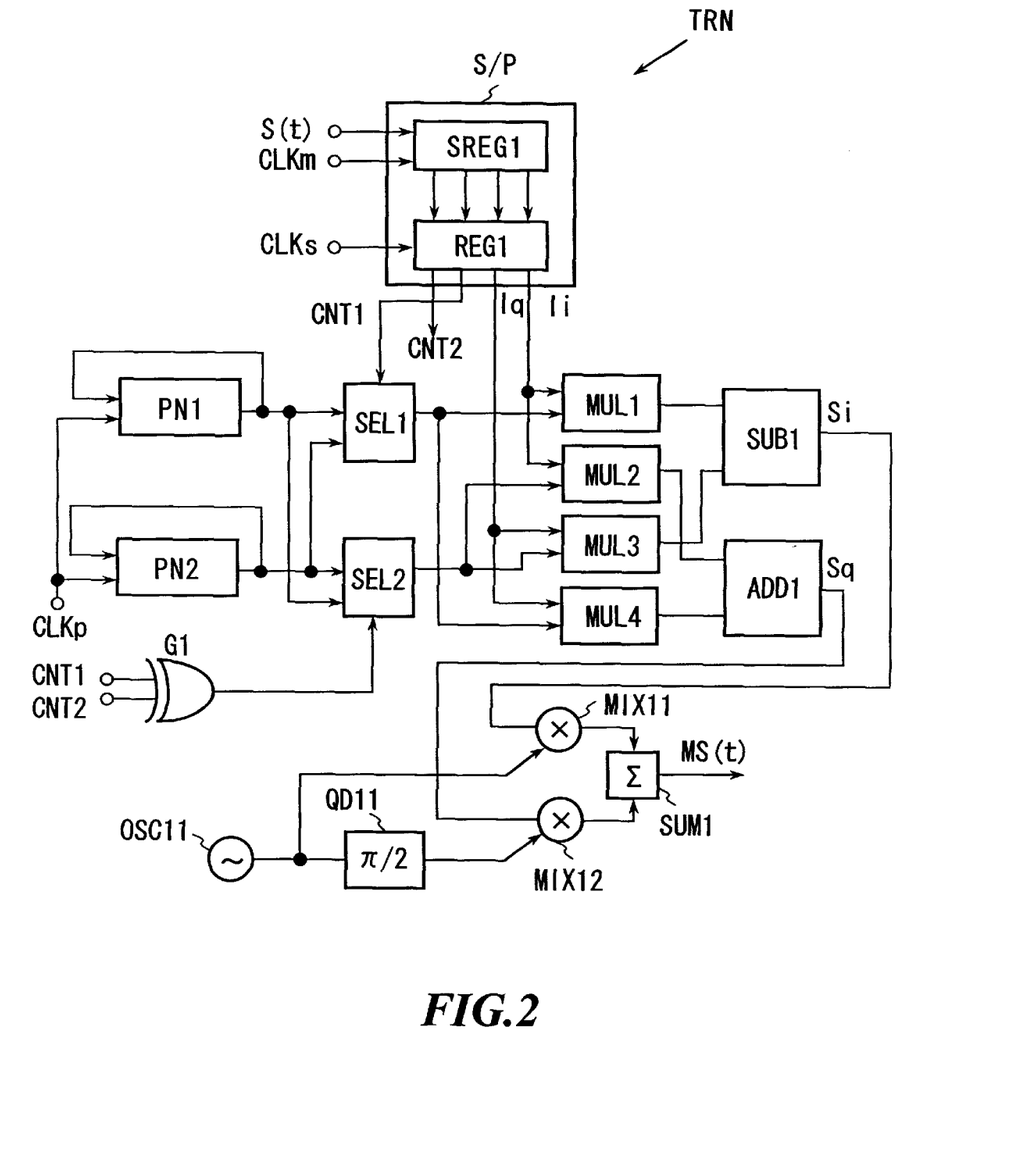
FIG. 2 is a block diagram of the transmitter TRN of FIG. 1.

FIG. 2 shows a transmitter TRN of the spread spectrum communication system shown in FIG. 1. The transmitter TRN comprises a shift resister SREG1 holding transmission data S(t) in 4-bit frames and a resister REG1 capable of being loaded with data from the shift register SREG1 in parallel. The register REG1 generates a 4-bit output, namely, the real part Ii of complex data I, the imaginary part IQ of the complex data I, and control signals CNT1 and CNT2. A main clock CLKm is applied to the shift register SREG1.

Transmission signal S(t) is written into the shift register SREG1 in synchronization with the main clock CLKm. A sub-clock CLKs having a clock cycle which is four-times that of the main clock CLKm is applied to the register REG1, after the four-bit data is stored into the shift register SREG1 to load the four-bit data from the shift register SREG1. The order of Ii, Iq, CNT1 and CNT2 is not limited as shown above, as long as a predetermined order is maintained.

The real part signal Ii is applied to inputs of multipliers MUL1 and MUL2. The imaginary part signal Iq is applied to inputs of multipliers MUL3 and MUL4. These multipliers MUL1 through MUL4 multiply the PN codes with signals Ii and Iq. Shift registers PN1 and PN2 contain the first and second PN codes, respectively, and output the PN codes to selectors SEL1 and SEL2 in parallel from the last stages of the shift registers PN1 and PN2.

The last stages of the shift registers PN1 and PN2 also feed back to their first stages, respectively. When the PN codes are M sequence, the shift registers PN1 and PN2 may comprise a linear feedback shift register wherein a generator polynomial of the PN code determines the feedback tap. Each selector SEL selects one PN code. The selector SEL1 provides its output to the multipliers MUL1 and MUL4, and the selector SEL2 provides its output to the multipliers MUL2 and MUL3. In multipliers MUL1 thorough MUL4, the input PN sequences PN1 and PN2 are output in a non-inverted manner when Ii and Iq equal "I", and are inverted when Ii and Iq equal "0".

The control signal CNT1 switches the selector SEL1. The control signals CNT1 and CNT2 are applied to respective inputs of an exclusive OR gate G1, the output of which controls the selector SEL2. If the PN codes in the shift registers PN1 and PN2 are designated as C1 and C2, respectively, the output of the selectors SEL1 and SEL2 may be expressed as shown in table 1 for given control signals CNT1 and CNT2.

TABLE 1

| CONT1 | CONT2 | G1 OUTPUT | SEL1 OUTPUT | SEL2 OUTPUT |
|-------|-------|-----------|-------------|-------------|
| 1 | 0 | 1 | C1 | C1 |
| 1 | 1 | 0 | C1 | C2 |
| 0 | 0 | 0 | C2 | C2 |
| 0 | 1 | 1 | C2 | C1 |

The output of the multipliers MUL1 and MUL3 are applied to respective inputs of a subtractor SUB1. The subtraction result of the MUL3 output from the MUL1 output is obtained as Si. The outputs of the multipliers MUL2 and MUL4 are applied to respective inputs of an adder ADD1 to obtain their sum Sq. The signals Si and Sq are real and imaginary parts of the spread signal, respectively.

The modulator MIX11 modulates the real part Si with a carrier signal generated by an oscillator OSC11. The quadrature carrier generator QD11 shifts the carrier signal by 90 degrees and a modulator MIX12 modulates the imaginary part Sq with the shifted carrier signal. Finally, the composer SUM1 combines the in-phase and quadrature signals modulated by the modulators MIX11 and MIX12, and transmits the combined signal to the antenna.

One of the following formulae (1) through (4) is applied depending on which combination of the PN codes shown in Table 1 is selected. The results are complex products of the complex numbers $(Ii+jIq)$ and $(Cx+jCy)$ (where, $Cx, Cy \in \{C1, C2\}$).

(a) when $CNT1 = 1, CNT2 = 0,$ (1)
$$Si + j*Sq = (Ii + j*Iq)(C1 + j*C1)$$
$$= C1(Ii - Iq) + j*C1(Ii + Iq)$$

(b) when $CNT1 = 1, CNT2 = 1,$ (2)
$$Si + j*Sq = (Ii + j*Iq)(C1 + j*C2)$$
$$= (C1*Ii - C2*Iq) + j(C2*Ii + C1*Iq)$$

(c) when $CNT1 = 0, CNT2 = 0,$ (3)
$$Si + j*Sq = (Ii + j*Iq)(C2 + j*C2)$$
$$= C2(Ii - Iq) + j*C2(Ii + Iq)$$

(d) when $CNT1 = 0, CNT2 = 1,$ (4)
$$Si + j*Sq = (Ii + j*Iq)(C2 + j*C1)$$
$$= (C2*Ii - C1*Iq) + j(C1*Ii + C2*Iq)$$

Figure 17:
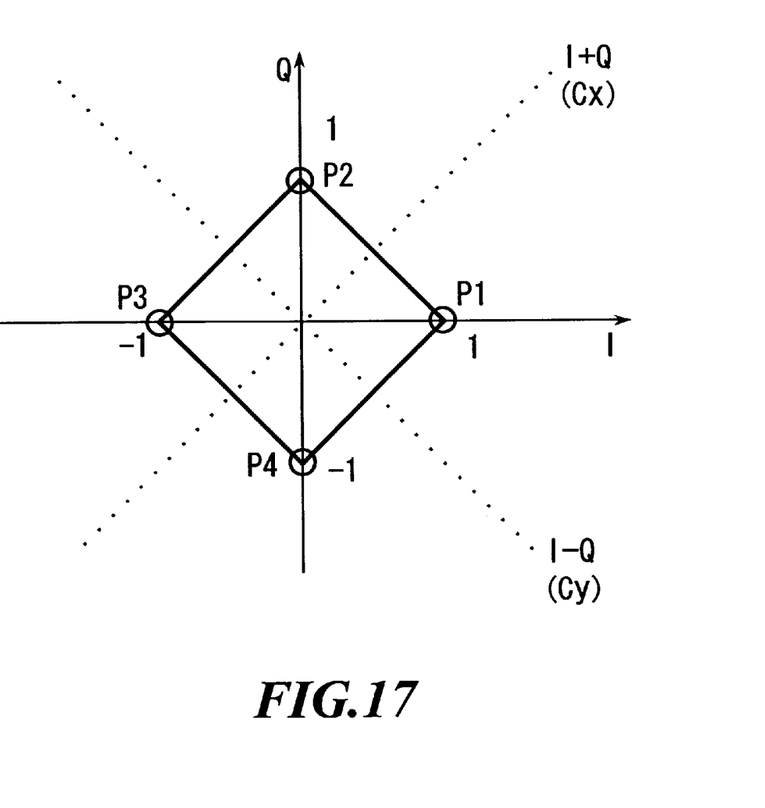
FIG. 17 is a distribution graph of the transmission signal phase.

FIG. 17 is a distribution graph illustrating the distribution of the modulated signal on the Gaussian plane. The graph includes a real axis representing the in-phase component and an imaginary axis representing the quadrature component. The modulated signals are distributed to four points, P1, P2, P3 and P4. Those points have one of three values with respect to each of the I and Q axes corresponding to three values, ±1 and 0, of the real and imaginary parts of the formulae (1) through (4).

When mapped on the I+Q axis (Cx axis) and I−Q axis (Cy axis) designated by broken lines, those four points have binary values. The two bits, (Ii, Iq) are mapped on these four points. The codes C1 and C2 are mapped on (Cx, Cy) according to variables CNT1 and CNT2. The different mapping types are (C1, C1), (C1, C2), (C2, C2) and (C2, C1) corresponding to the 2-bit data determined by the control signals CNT1 and CNT2. The data (Cx, Cy) are transmitted by a code expressed in binary form on the I+Q and I−Q axes.

In other words, the 2-bit information is transmitted by (Cx, Cy) mapping. Together with the information Ii and Iq, a total of 4-bits of information is transmitted, for each signal point.

Figure 3:
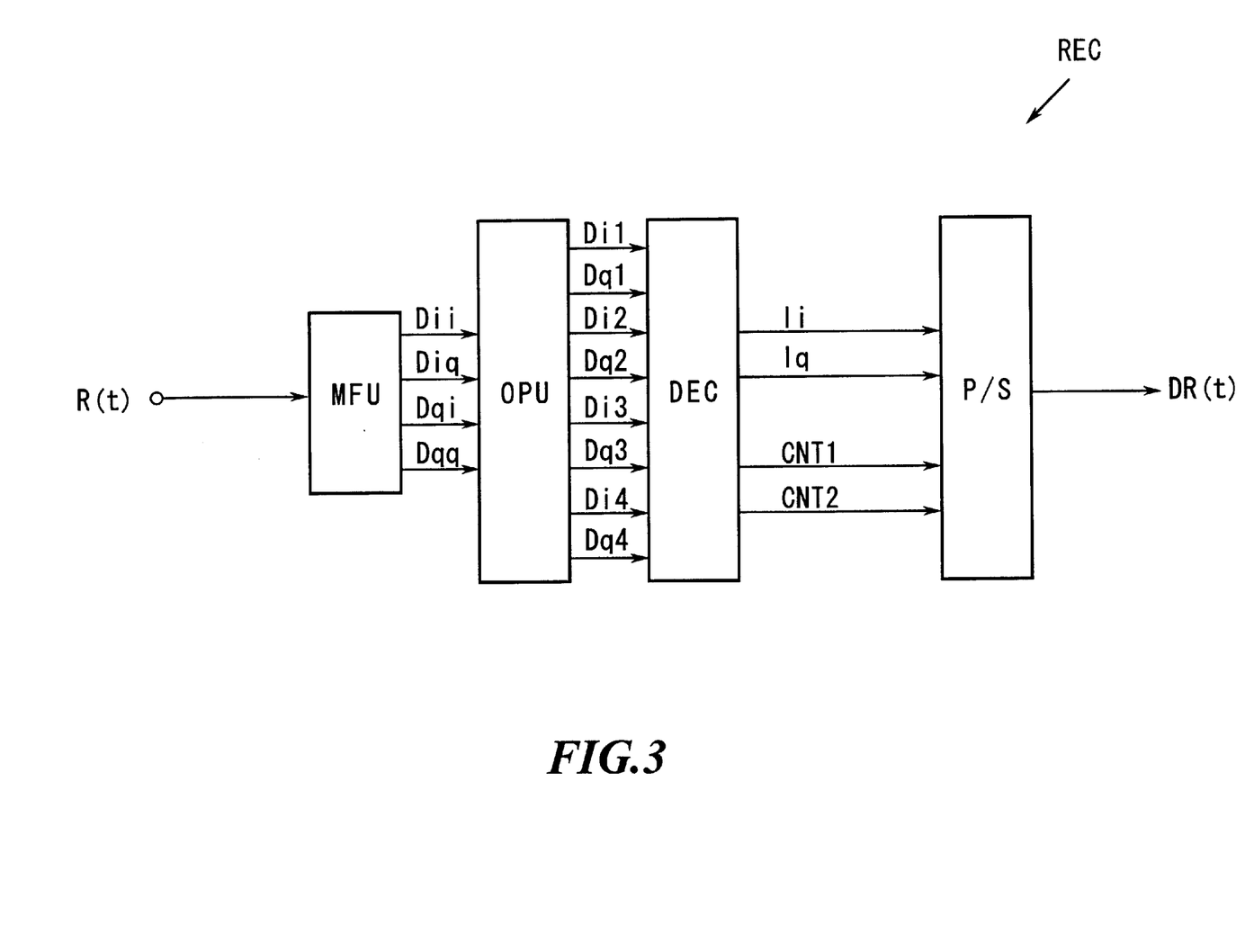
FIG. 3 is a block diagram of the receiver REC of FIG. 1.

FIG. 3 illustrates a receiver REC of the spread spectrum communication system shown in FIG. 1. The receiver REC has a matched filter unit MFU, an operation unit OPU, a decoder unit DEC, and a parallel to serial converter P/S, which are connected in series. The matched filter unit MFU demodulates a received signal R(t) and multiplies the demodulated signal by the PN codes.

The outputs from the matched filter unit MFU are processed by the operation unit OPU and further decoded into the parallel signal Ii, Iq, CNT1 and CNT2 by the decoder unit DEC. The parallel to serial converter P/S converts signals Ii, Iq, CNT1 and CNT2 output from the decoder unit DEC into a serial signal DR(t).

Figure 4:
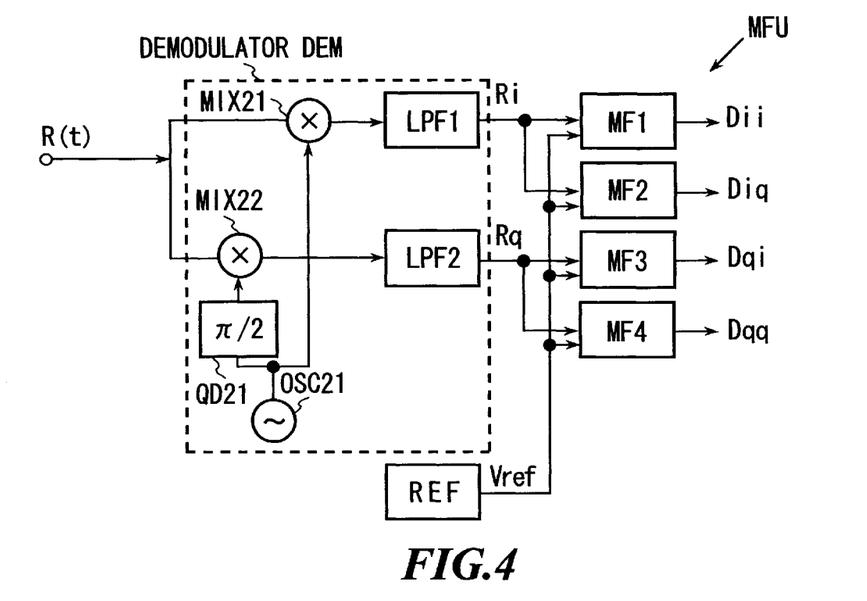
FIG. 4 is a block diagram of the matched filter unit MFU of FIG. 3.

FIG. 4 illustrates the matched filter unit MFU of the receiver REC shown in FIG. 3. The matched filter unit MFU has matched filters MF1 through MF4 which despread the demodulated signals Ri and Rq and output Dii, Diq, Dqi and Dqq, respectively. The mixer MIX21 combines the received signal R(t) with an in-phase signal provided by an oscillator OSC21. The mixer MIX22 combines the received signal R(t) with a quadrature signal, which is shifted from the in-phase signal by 90 degrees using a phase shifter QD21. As a result, the received signal R(t) is divided into in-phase and quadrature phase parts, which become receiving signal components Ri and Rq by passing through low pass filters LPF1 and LPF2, respectively.

The component Ri is applied to inputs of the matched filters MF1 and MF2, and the component Rq is applied of inputs of the matched filters MF3 and MF4. The reference voltage generator REF supplies a reference voltage Vref to the matched filters MF1 through MF4. The matched filters MF1 and MF3 correspond to the PN code C1, and the matched filters MF2 and MF4 correspond to the PN code C2.

With a transmission signal Si+jSq, and a phase rotation $\theta$ in the transmission path, the received signal may be expressed by a complex number having in-phase and quadrature components on real and imaginary axes, as follows:

$$Ri + Rq = (Si + iSq)e^{j\theta} \quad (5)$$
$$= Si\cos\theta - Sq\sin\theta + j(Sq\cos\theta + Si\sin\theta)$$

thus, $$Ri = Si\cos\theta - Sq\sin\theta \quad (6)$$

$$Rq = Sq\cos\theta + Si\sin\theta \quad (7)$$

Therefore, despreading operations for the above conditions (a) through (d) are expressed as (A) through (D), respectively. Here, Di and Dq are the real part and the imaginary part, respectively. Noise and other small effects of the transmission path are omitted.

(A) when $Si1 = C1(Ii - Iq)$ and $Sq1 = C1(Ii + Iq)$, $$Dii = Ri * C1 \quad (8)$$
$$= C1^2(Ii - Iq)\cos\theta - C1^2(Ii + Iq)\sin\theta$$

$$Diq = Ri * C2 \quad (9)$$
$$= C1 * C2(Ii - Iq)\cos\theta - C1 * C2(Ii + Iq)\sin\theta$$

$$Dqi = Rq * C1 \quad (10)$$
$$= C1^2(Ii + Iq)\cos\theta - C1^2(Ii - Iq)\sin\theta$$

$$Dqq = Rq * C2 \quad (11)$$
$$= C1 * C2(Ii + Iq)\cos\theta - C1 * C2(Ii - Iq)\sin\theta$$

Thus, $$Di1 = Dii + Dqi = 2 * C1^2(Ii\cos\theta - Iq\sin\theta) \quad (12)$$

$$Dq1 = Dqi - Dii = 2 * C1^2(Iq\cos\theta + Ii\sin\theta) \quad (13)$$

(B) when $Si2 = C1 * Ii - C2 * Iq$ and
$Sq2 = C2 * Ii + C1 * Iq$, $$\begin{aligned} Dii &= Ri * C1 \\ &= C1^2(Ii\cos\theta - Iq\sin\theta) - \\ &\quad C1 * C2(Iq\cos\theta + Ii\sin\theta) \end{aligned} \quad (14)$$

$$\begin{aligned} Diq &= Ri * C2 \\ &= -C2^2(Ii\sin\theta + Iq\cos\theta) + \\ &\quad C1 * C2(Ii\cos\theta + Iq\sin\theta) \end{aligned} \quad (15)$$

$$\begin{aligned} Dqi &= Rq * C1 \\ &= C1^2(Ii\sin\theta + Iq\cos\theta) + \\ &\quad C1 * C2(Ii\cos\theta - Iq\sin\theta) \end{aligned} \quad (16)$$

$$\begin{aligned} Dqq &= Rq * C2 \\ &= C2^2(Ii\cos\theta - Iq\sin\theta) + \\ &\quad C1 * C2(Ii\sin\theta + Iq\cos\theta) \end{aligned} \quad (17)$$

Thus, $$Di2 = Dii + Dqq = (C1^2 + C2^2)(Ii\cos\theta - Iq\sin\theta) \quad (18)$$

$$Dq2 = Dqi - Diq = (C1^2 + C2^2)(Ii\sin\theta + Iq\cos\theta) \quad (19)$$

(C) when $Si3 = C2(Ii - Iq)$ and $Sq3 = C2(Ii + Iq)$, $$Dii = Ri * C1 = C1 * C2(Ii - Iq)\cos\theta - C1 * C2(Ii + Iq)\sin\theta \quad (20)$$

$$Diq = Ri * C2 = C2^2(Ii - Iq)\cos\theta - C2^2(Ii + Iq)\sin\theta \quad (21)$$

$$Dqi = Rq * C1 = C1 * C2(Ii + Iq)\cos\theta + C1 * C2(Ii - Iq)\sin\theta \quad (22)$$

$$Dqq = Rq * C2 = C2^2(Ii + Iq)\cos\theta + C2^2(Ii - Iq)\sin\theta \quad (23)$$

Thus, $$Di3 = Dqq + Diq = 2 * C2^2(Ii\cos\theta - Iq\sin\theta) \quad (24)$$

$$Dq3 = Dqq - Diq = 2 * C2^2(Ii\sin\theta + Iq\cos\theta) \quad (25)$$

(D) when $Si4 = C2 * Ii - C1 * Iq$ and
$Sq4 = C1 * Ii + C2 * Iq$, $$\begin{aligned} Dii &= Ri * C1 \\ &= -C1^2(Ii\sin\theta + Iq\cos\theta) + \\ &\quad C1 * C2(Ii\cos\theta - Iq\sin\theta) \end{aligned} \quad (26)$$

$$\begin{aligned} Diq &= Ri * C2 \\ &= C2^2(Ii\cos\theta - Iq\sin\theta) - \\ &\quad C1 * C2(Ii\sin\theta + Iq\cos\theta) \end{aligned} \quad (27)$$

$$\begin{aligned} Dqi &= Rq * C1 \\ &= C1^2(Ii\cos\theta - Iq\sin\theta) + \\ &\quad C1 * C2(Ii\sin\theta + Iq\cos\theta) \end{aligned} \quad (28)$$

-continued $$Dqq = Rq * C2 \quad (29)$$
$$= C2^2(Ii\sin\theta + Iq\cos\theta) +$$
$$C1 * C2(Ii\cos\theta + Iq\sin\theta)$$

Thus, $$Di4 = Diq + Dqi = (C1^2 + C2^2)(Ii\cos\theta - Iq\sin\theta) \quad (30)$$

$$Dq4 = Dqq - Dii = (C1^2 + C2^2)(Iq\cos\theta + Ii\sin\theta) \quad (31)$$

The absolute values of these complex numbers (signal levels) are calculated by the following formulae (32) through (34).

$$\sqrt{(Di1^2 + Dq1^2)} = (2*C1^2)\sqrt{(Ii^2 + Iq^2)} \quad (32)$$

$$\sqrt{(Di2^2 + Dq2^2)} = \sqrt{(Di4^2 + Dq4^2)} \quad (33)$$
$$= (C1^2 + C2^2)\sqrt{(Ii^2 + Iq^2)}$$

$$\sqrt{(Di3^2 + Dq3^2)} = (2*C2)\sqrt{(Ii^2 + Iq^2)} \quad (34)$$

The above formulae are obtained when the PN codes to be transmitted correspond to the despreading PN codes. If the despreading PN code does not correspond to the PN code to be transmitted, the formula (B) becomes as follows:

(B-1) When despread according to the above condition (A), $$Di1 = Dii + Dqi \quad (35)$$
$$= C1(C1 - C2)(Ii\cos\theta + Iq\sin\theta) +$$
$$C1(C1 + C2)(Ii\cos\theta - Iq\sin\theta)$$

$$Dqi = Dqi - Dii \quad (36)$$
$$= C1(C1 - C2)(Iq\sin\theta - Ii\cos\theta) +$$
$$C1(C1 + C2)(Ii\sin\theta + Iq\cos\theta)$$

Since the codes C1 and C2 are orthogonal, $C1*C2=0$. Therefore, the complex absolute value (signal level) is expressed as formula (37).

$$\sqrt{(Di1^2+Dq1^2)}=\sqrt{2}C1^2\sqrt{(Ii^2+Iq^2)} \quad (37)$$

This absolute value is about $1/\sqrt{2}$ of that of formula (33), which can be distinguished from the absolute value of formula (40).

(B-2) When despread according to the above condition (C), $$Di3 = Dqq + Diq \quad (38)$$
$$= C2^2 * \{Ii(\sin\theta - \cos\theta) - Iq(\sin\theta + \cos\theta)\}$$

$$Dq3 = Dqi - Dii \quad (39)$$
$$= C2^2 * \{Ii(\sin\theta + \cos\theta) - Iq(\sin\theta - \cos\theta)\}$$

thus, $$\sqrt{(Di3^2 + Dq3^2)} = \sqrt{2C2^2}\sqrt{(Ii^2 + Iq^2)} \quad (40)$$

This absolute value is also about $1/\sqrt{2}$ of that of formula (33), which can be distinguished from the absolute value of formula (40).

(B-3) When despread according to the above condition (D), $$Di4 = Diq + Dqi \quad (41)$$
$$= 2C1*C2(Ii\cos\theta - Iq\sin\theta) +$$
$$(C1^2 - C2^2)(Ii\sin\theta + Iq\cos\theta)$$

$$Dq4 = Dqq - Dii \quad (42)$$
$$= 2C1*C2(Ii\sin\theta + Iq\cos\theta) -$$
$$(C1^2 - C2^2)(Ii\cos\theta - Iq\sin\theta)$$

thus, $$\sqrt{(Di4^2 + Dq4^2)} = \sqrt{(C1^2 - C2^2)(Ii^2 + Iq^2)} \approx 0 \quad (43)$$

The absolute value of formula (33) is sufficiently larger than that of formula (42) and can be distinguished from this.

Figure 5:
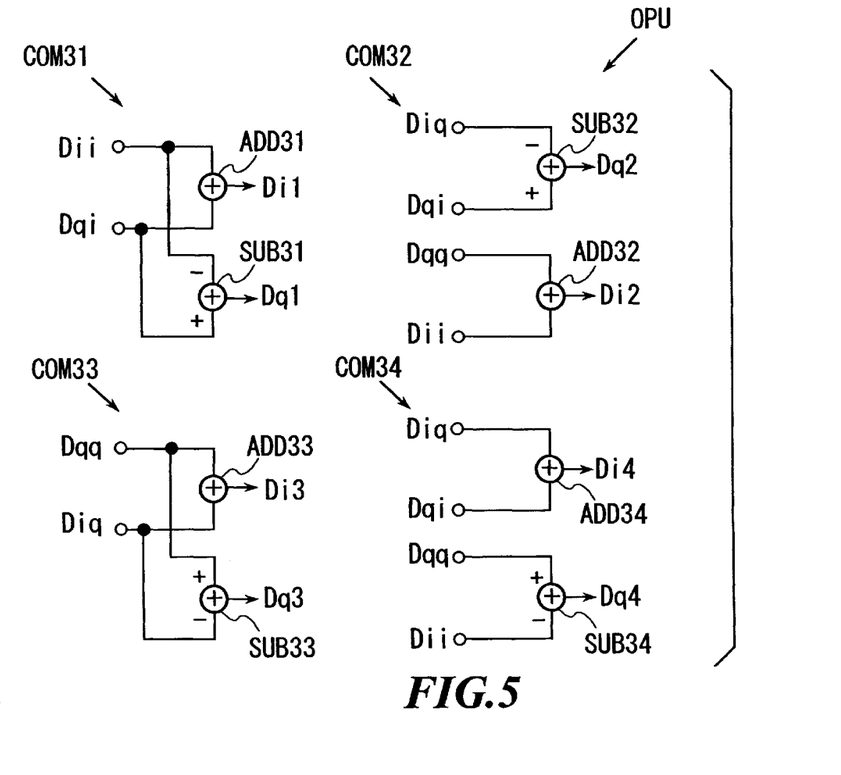
FIG. 5 is a schematic diagram of the operation unit OPU of FIG. 3.

FIG. 5 shows an operator unit OPU shown in FIG. 3. The operator unit OPU has operators COM31, COM32, COM33 and COM34, which operate as shown by the formulae (A) through (D), respectively.

The operator COM31 comprises an adder ADD31 and a subtractor SUB31, which together generate Di1=Dii+Dqi according to formula (12), and Dq1=Dqi-Dii according to formula (13). Similarly, the operator COM32 comprises an adder ADD32 and a subtractor SUB32, which together generate Di2=Dii+Dqq according to formula (18) and Dq2=Dqi-Diq according to formula (19). The operator COM33 comprises an adder ADD33 and a subtractor SUB33, which generate Di3=Dqq+Diq of formula (24) and Dq3=Dqq-Diq of formula (25). The operator COM34 comprises an adder ADD34 and a subtractor SUB34, which together generate Di4=Diq+Dqi of formula (30) and Dq4=Dqq-Dii of formula (31).

Figure 6:
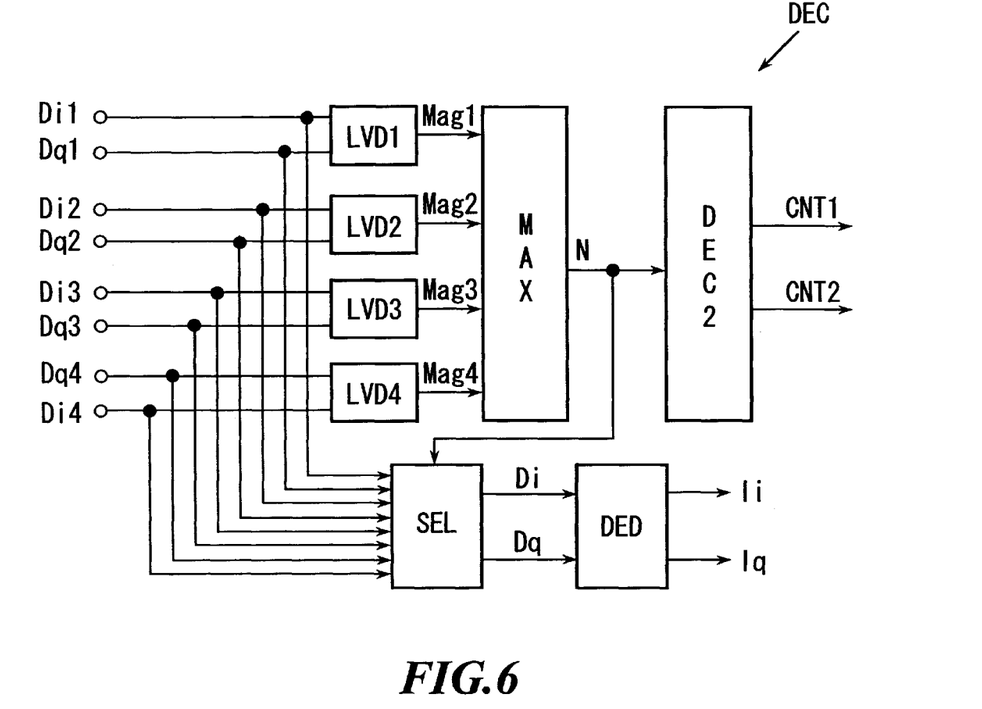
FIG. 6 is a block diagram of the demodulator unit DEM of FIG. 3.

FIG. 6 illustrates an exemplary decoder unit DEC as shown in FIG. 3. The decoder unit DEC receives the operation results of the operation unit OPU. The decoder unit DEC has signal level detectors LVD1, LVD2, LVD3 and LVD4 corresponding to the operation results of formulae (A) through (D) respectively. The signal level detectors LVD1 through LVD4 calculate absolute values of the complex numbers based on the real parts Di1 through Di4 and the imaginary parts Dq1 through Dq4. As seen above, peak levels can be detected regardless of the rotational phase, by calculating the absolute values.

The outputs of the level detectors LVD1 through LVD4 are applied to an input of a maximum selector circuit MAX, which outputs the number N of the level detector LVD having the largest absolute value. The maximum signal is easily detected, because the absolute value is sufficiently small ($1/\sqrt{2}$) when the despreading PN code does not correspond to the PN code to be transmitted.

The number N is applied to inputs of a decoder DEC2 and a selector SEL. The decoder DEC2 outputs control signals CNT1 and CNT2 based on the number N. The selector SEL selects operation results designated by the number N and outputs them as signals Di and Dq, which are applied to inputs of the decoder DED for regenerating complex data Ii and Iq. A conventional decoder can be used as the decoder DED.

Figure 7:
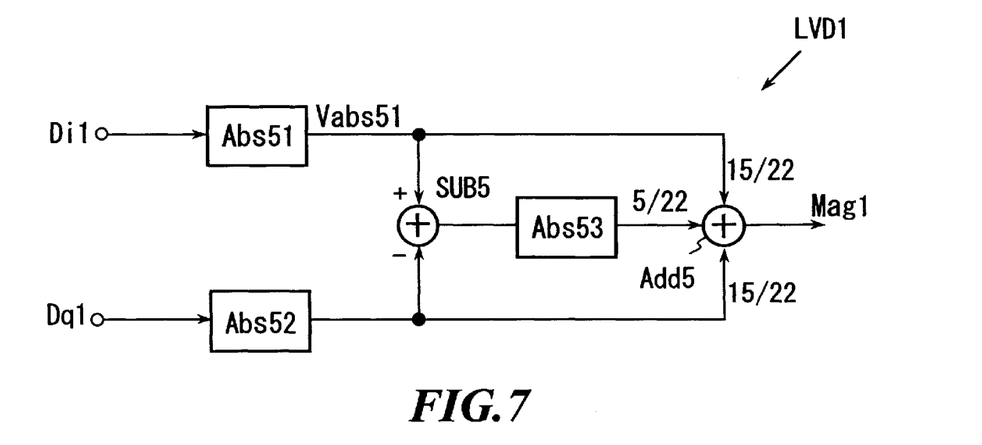
FIG. 7 is a block diagram of the level detector LVD of FIG. 4.

FIG. 7 shows an example of the level detector LVD1. The level detector LVD1 determines a complex absolute value Mag1 based on signals Di1 and Dq1 using the following approximating operation.

$$Mag1=15/22|Di1|+15/22|Dq1|+5/22||Di1|-|Dq1|| \quad (44)$$

This approximation is described in a Japanese Patent Application, 7-274839 filed by the applicant of the present invention, and is very accurate in all ranges. The level detector LVD1 comprises the first and second absolute value circuits Abs51 and Abs52 which receive signals Di1 and Dq1, respectively.

The subtractor SUB5 subtracts the outputs of absolute value circuit Abs52 from the output of the absolute value circuit Abs51 and provides the result to an absolute value circuit Abs53. The adder Add5 adds the outputs from absolute value circuits Abs51, Abs52 and Abs53 after multiplying them by 15/12, 15/22 and 5/22, respectively, to calculate the absolute value of formula (32). Other level detectors LVD2 through LVD4 are the same as LVD1 and their explanations are therefore omitted.

Figures 8, 9:
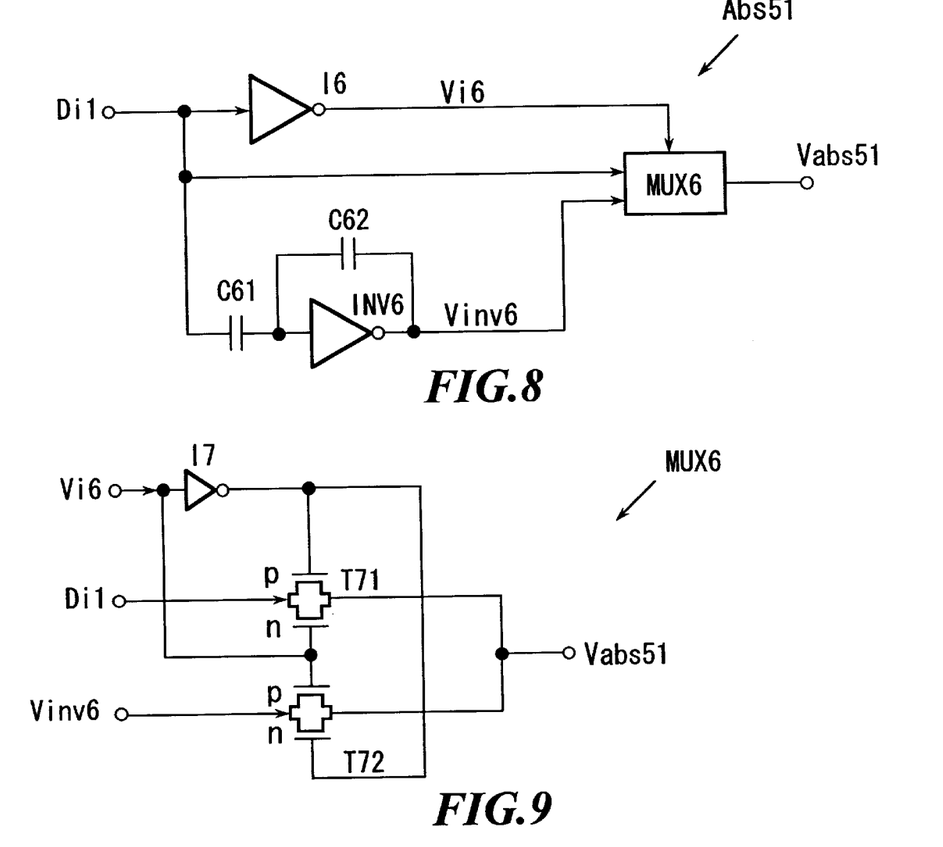
FIG. 8 is a schematic diagram of the absolute value circuit Abs51 of FIG. 5.
FIG. 9 is a schematic diagram of the multiplexer MUX6 of FIG. 6.

FIG. 8 shows an example of the absolute value circuit Abs51. The absolute value circuit Abs51 has a MOS inverter I6, which determines whether the input voltage Di1+Vdd/2, which has a reference level vdd/2, is greater than a threshold voltage Vdd/2 to determine whether the input signal Di1 is greater than a threshold C. The inverter I6 outputs Vdd when the input Di1 is less than the threshold, and outputs 0[V] when the input Di1 is greater than the threshold.

The input signal Di1 is also fed through a capacitor C61 to an inverter INV6 having a feed back capacitor C62. Capacitors C61 and C62 have the same capacitance and the inverse signal Vinv6 of Di1 (Vdd/2−Di1) is provided as an output. The inverse output Vinv6 and the input signal Di1 are applied to the input of the multiplexer MUX6. The multiplexer MUX6 selects signal Di1 or the inverse signal Vinv6 based on the output Vi6 of the inverter I6. The absolute value circuits Abs52 and Abs53 are the same as the absolute circuit Abs51 and their explanations are therefore omitted.

FIG. 9 shows an example of the multiplexer MUX6 of FIG. 8. The multiplexer MUX6 comprises a pair of MOS switches T71 and T72 which receive signals Di1 and Vinv6, respectively. In the MOS switch T71, the gate control signal Vi6 is applied to the n-MOS gate, and the inverse signal of Vi6 is applied to the p-MOS gate. In the MOS switch T72, the control signal Vi6 is applied to p-MOS gate, and the inverse signal of Vi6 is applied to the n-MOS gate. In other words, switches T71 and T72 close alternately, and output either voltage Di1 or Vinv6 as the output Vabs51.

Figure 10:
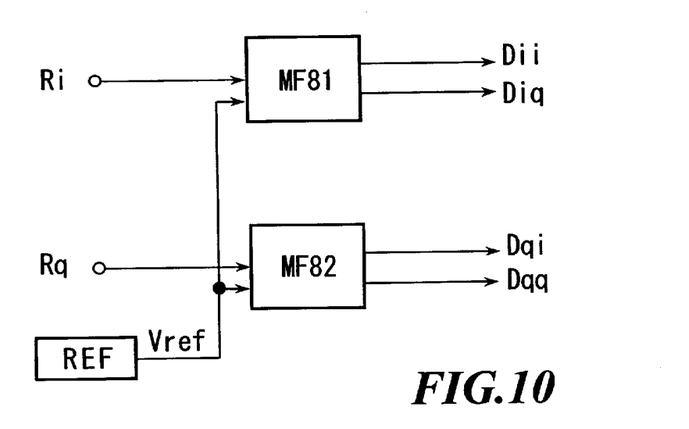
FIG. 10 is a block diagram of the alternative embodiment of the matched filter of MF1 through MF4 in FIG. 4.

FIG. 10 shows an alternate example of the matched filters MF1 through MF4 and the reference voltage generator REF of FIG. 4. Two matched filters MF1 and MF2 are realized by one matched filter MF81, and two matched filters MF3 and MF4 are realized by one matched filter MF82.

Figure 11:
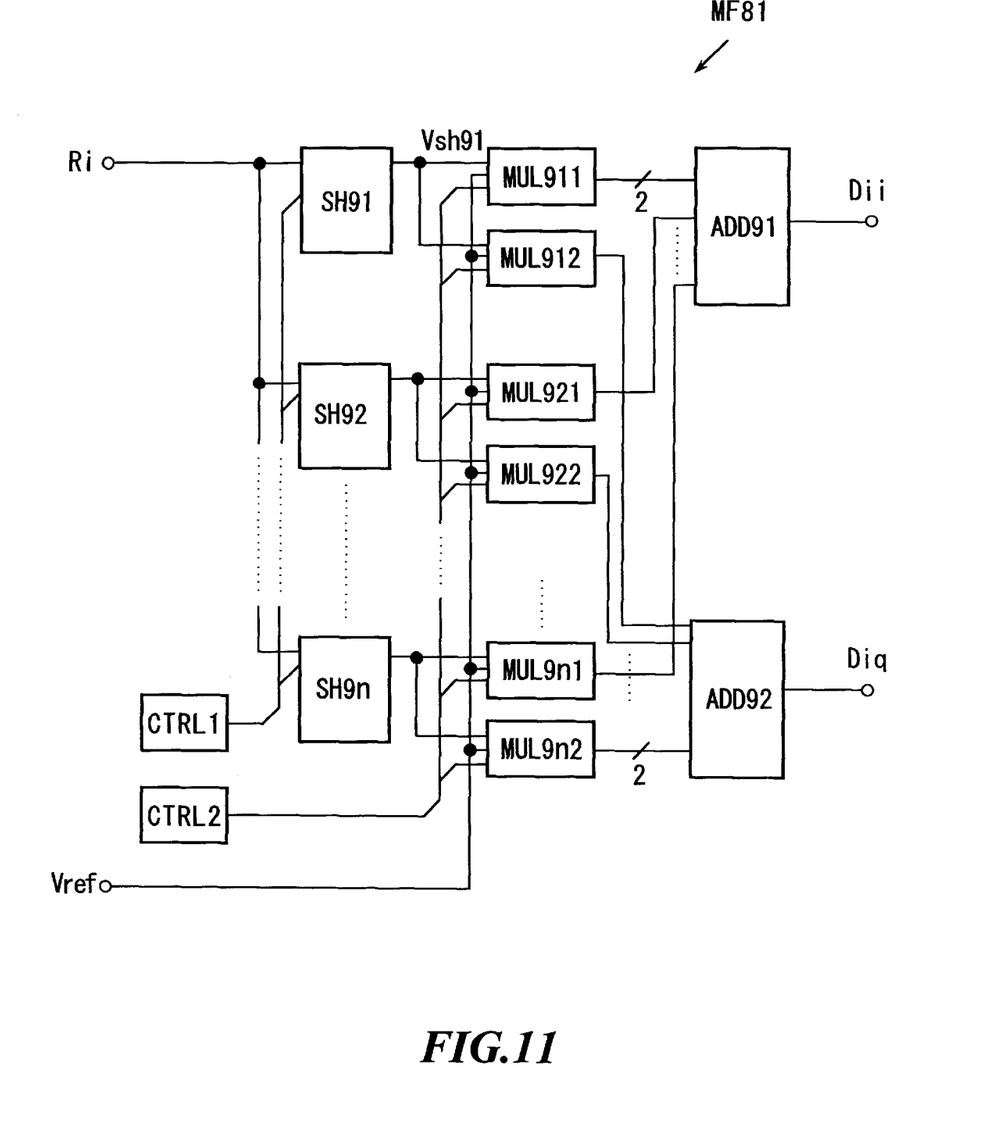
FIG. 11 is a block diagram of the matched filter of FIG. 10.

FIG. 11 illustrates an example of the matched filter MF81 of FIG. 10. The matched filter MF81 comprises n sample holders SH91 through SH9n, where n is a tap number of the matched filter MF81. The input signal Ri is connected to the sample holders SH91 through SH9n in parallel. A controller CTRL1 allows only one of the sample holders SH91 through SH9n to take in the received signal Ri, at a time. A controller CTRL2 stores PN codes C1 and C2, similarly to the transmitter TRN, and controls the multipliers MUL9i1 and MUL9i2 (i=1 to n), based on the PN code C1 and C2, respectively.

Each sample holder outputs one unit of holding data to two multipliers. For example, the output of the sample holder SH91 is fed to multipliers MUL911 and MUL912. Similarly, the output of the sample holder SH92 is fed to the multipliers MUL921 and MUL922. The output of the sample holder SH93 is fed to the multipliers MUL931 and MUL932. The output of the sample holder SH9n is fed to the multipliers MUL9n1 and MUL9n2. Each multiplier is also connected to a controller CTRL2 and is controlled based on which of the PN code C1 or C2 is being used.

The two sets of multipliers MUL9i1 and MUL9i2 (i=1~n) correspond to the two matched filters MF1 and MF2 of FIG. 4. The outputs from the multipliers MUL9i1 (i=1~n) are fed to an adder ADD91. The outputs from multipliers MUL9i2 (i=1~n) are fed to an adder ADD92. The adders ADD91 and ADD92 add their inputs and output the results Dii and Diq, respectively. The matched filter MF82 is the same as the matched filter MF81 and its explanation is therefore omitted.

One set of the sample holders SH91 through SH9n holds the input signal Ri for plural sets of correlation operations. Thus, the whole circuit is smaller and consumes less energy when compared to a matched filter having separate sets of sample holders.

Figure 12:
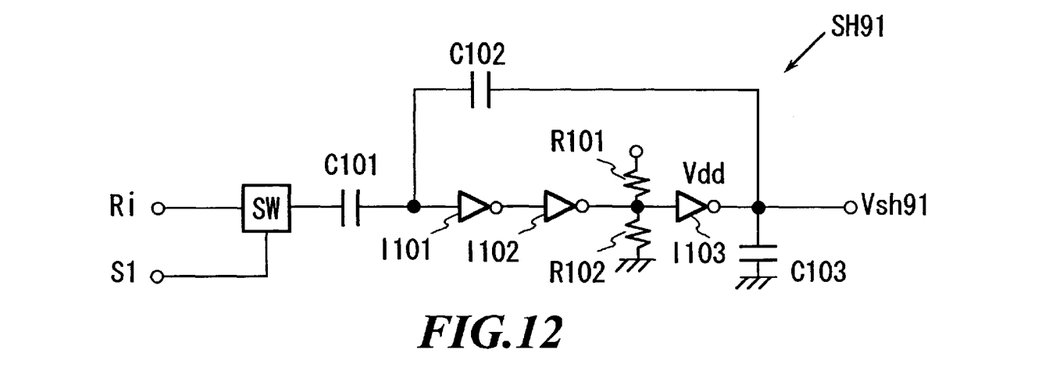
FIG. 12 is a schematic diagram of the sample holder of FIG. 11.

FIG. 12 shows an example of the sample holder SH91. In FIG. 12, the input signal Ri is fed to a capacitor C101 through a switch SW. The switch SW is controlled by a control signal S1 from the controller CTRL1. The three-stage MOS inverter, having MOS inverters I101, I102 and I103 connected in series, receives the output of the capacitor C101. The output Vsh91 of the last inverter I103 is fed back to the input of the first inverter I101 through a feedback capacitor C102, which makes the output Vsh91 substantially linear. When the switch SW is closed, the capacitor C101 is charged or discharged to the level of Ri, while the linearity is assured by the feedback capacitor C102. When the switch SW is opened, the sample holder SH91 holds the signal level of Ri.

The output of the last inverter I103 is grounded through a capacitor C103. The output of the second inverter I102 is connected to a power source of voltage Vdd and to a ground through a pair of balance resistors R101 and R102. These elements prevent oscillation of the inverse amplifier having as might otherwise occur due to the feedback system. Sample holders SH92 through SH9n have the same construction as the sample holder SH91 and their explanations are therefore omitted.

The sample holders SH91 through SH9n do not transfer data between one another, and therefore, errors resulting from data transfer can be prevented. On the other hand, correspondence between the data and PN codes changes periodically, while the PN codes rotate. Since the PN codes are binary data, standard digital circuits can be adopted for storing the PN codes, and the data transfer does not cause any error.

Figure 13:
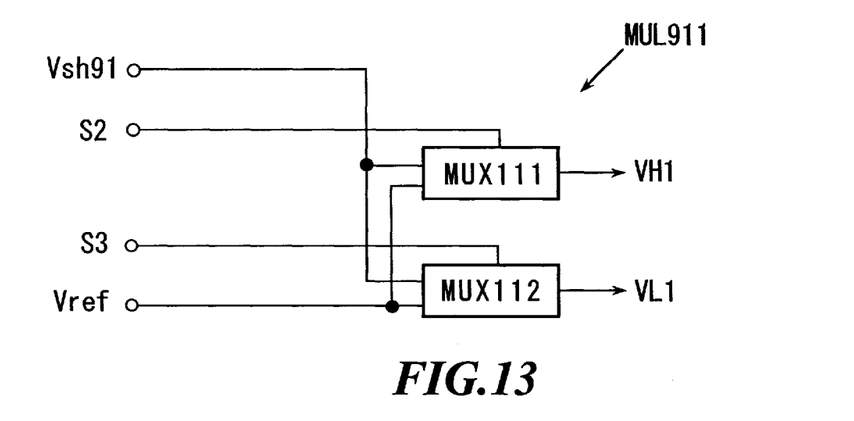
FIG. 13 is a block diagram of the multiplier of FIG. 11.

FIG. 13 shows an example of the multiplier MUL911 of FIG. 11. The multiplier MUL911 comprises two multiplexers MUX111 and MUX112. The output Vsh91 of the sample holder SH91 and a reference voltage Vref are applied to the multiplexers MUX111 and MUX112. The controller CTRL2 (FIG. 11) controls the multiplexers MUX111 and MUX112 using signals S2 and S3, respectively, which are inverted with respect to one another. When one multiplexer outputs Vsh91, another multiplexer outputs the reference voltage Vref.

The multiplexers MUX111 and MUX112 correspond to the spread codes "1" (high level) and "−1" (low level). When multiplying code "1" to the input voltage Vsh91, multiplexer MUX1 outputs Vsh91. When multiplying "−1", multiplexer MUX112 outputs Vsh91. The outputs of multiplexers MUX111 and MUX112 are shown as VH1 and VL1 representing the high and the low levels, respectively.

After all data held in the sample holders SH91 through SH9n are processed, a new data is taken into a sample holder holding the oldest data, in response to the control signal S1 fed by the controller CTRL1. Meantime, the PN codes rotate for a new operation. By repeating such operations, the matched filter continuously processes the received data.

Figure 14:
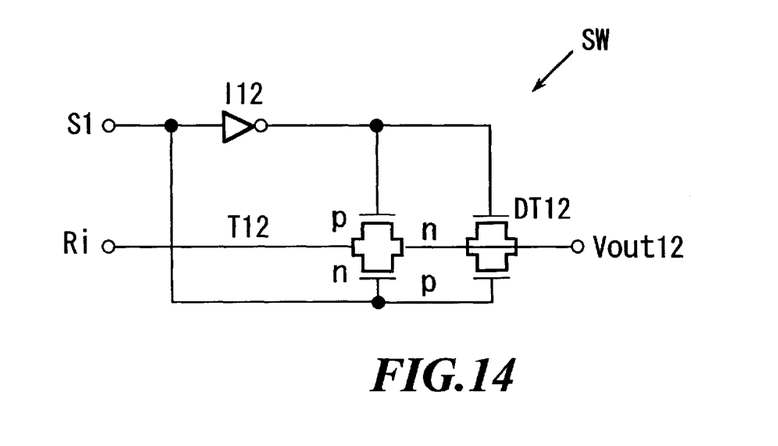
FIG. 14 is a schematic diagram of the switch SW of FIG. 12.

FIG. 14 shows an example of the switch SW of FIG. 12. The switch SW comprises a transistor circuit T12 connecting a source and a drain of an n-MOS transistor to a drain and a source of p-MOS transistor, respectively. The input voltage Ri is given to the drain side of an n-MOS transistor. The source of the n-MOS is connected to the output Vout12 through a dummy transistor DT12 constructed in the same manner. The control signal S1 is fed to a gate of the n-MOS transistor of the transistor circuit T12. The control signal S1 after being inverted by an inverter I12 is fed to a gate of p-MOS transistor. Therefore, when the control signal S1 is high, the transistor circuit T12 is conductive, and when the control signal S1 is low, the transistor circuit T12 is not conductive.

Figure 15:
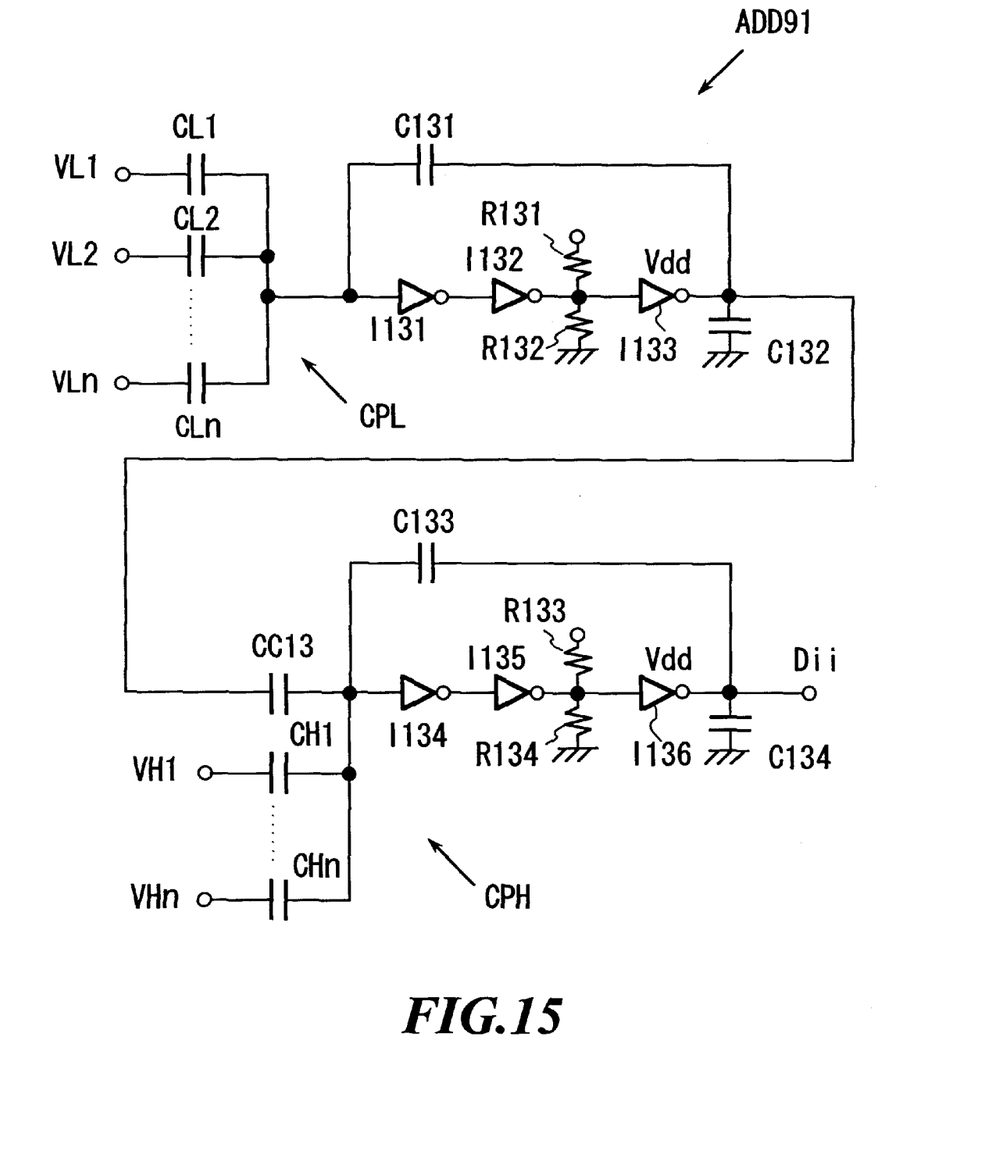
FIG. 15 is a schematic diagram of the adder ADD91 of FIG. 11.

FIG. 15 shows an example of the adder ADD91 of FIG. 11. The adder ADD91 comprises a capacitor coupling circuit CPH, receiving high level signals VH1 through VHn from the multipliers MUL911 through MUL9n1. The adder ADD91 further comprises a capacity coupling circuit CPL receiving low level signals VL1 through VLn from the multipliers MUL911 through MUL9n1.

The capacitor coupling circuit CPL has capacitors CL1 through CLn connected in parallel. The capacitor coupling circuit CPH has capacitors CH1 through CHn connected in parallel. The output of the coupling circuit CPL is applied to the first inverter I131 of a three-sage set of MOS inverters I131, I132 and I133 connected in series. The output of the last inverter I133 is fed back to the first inverter input through a feedback capacitor C131. This three-stage set of inverters provides linearity with a sufficiently large open-loop gain.

The output of the capacitor coupling circuit CPH is connected to the first stage input of another set of three-stage MOS inverters I134, I135 and I136, which are connected in series. The output of the inverter I136 is fed back to the first inverter input through a feedback capacitor C133. This three-stage set of inverters provides linearity with a sufficiently large open-loop gain.

Further, the output from the inverter I133 is applied to the input of the inverter I134 through a coupling capacitor CC13 provided in parallel with the capacitor coupling circuit CPH. An inverse sum output from the capacitor coupling circuit CPL and another sum output from the capacitor coupling circuit CPH are applied to the three-stage inverters I134 through I136.

The outputs from the last inverters I133 and I136 of the three-stage MOS inverters are grounded through capacitors C132 and C134, respectively. The output of the second inverters I132 and I135 are connected to the power source of voltage Vdd and to ground through pairs of balance resistors R131 and R132, and R133 and R134. These elements prevent oscillation of the inverse amplifiers as might otherwise occur due to the feedback arrangements.

The adder ADD91 operates in accordance with formula (45). Since the relationships among capacitors are set according to formulae (46) through (48), formula (49) is invoked as a result.

$$Dii = Vdd - \frac{\left(Vdd - \frac{\sum_{i=1}^{n} Vli*CLi}{C131}\right)*CC13 + \sum_{i=1}^{n} Vhi*CHi}{C133} \tag{45}$$

$$CL1 = CL2 = \ldots = CLn \tag{46}$$

$$CH1 = CH2 = \ldots = CHn \tag{47}$$

$$C131 = C133 = CC13 = n*CLi = n*CHi \tag{48}$$

$$Dii = \left\{\sum_{i=1}^{n}(VLi - VHi)\right\}/n \tag{49}$$

Voltages VLi and VHi may be expressed in accordance with formulae (50) and (51) using reference voltage Vref.

$$VHi = Vref + vhi \tag{50}$$

$$VLi = Vref + vli \tag{51}$$

Formula (52) is obtained by substituting formulae (50) and (51) into formula (49).

$$Dii = \left\{\sum_{i=1}^{n}(Vli - Vhi)\right\}/n \tag{52}$$

Further, the three-stage inverter in the sample holder inverts data. Thus, the input data for ADD91, VL1 through VLn and VH1 through VHn are inverted. Since either VLi or VHi becomes 0 in accordance with the PN code, the output Vout13 resulting from multiplying the input data by the PN code is obtained. In other words, with time t, chip time Tc and a natural number i, the input signal Ri held by the sample holders SH91 through SH9n is expressed as S(t−i * Tc) By multiplying with the PN code, PNi, formula (52) is rewritten as formula (53), which is a general matched filter operation. Moreover, since the PN codes are rotated, relationships between sample holders and PN codes are renewed at every chip time.

$$Dii = \left\{\sum_{i=1}^{n}(PNi*S(t - i*TC)\right\}/n \tag{53}$$

Since the output is normalized by the number n of inputs in these operations, the maximum voltage of the output does not exceed the energy source voltage and stability is assured.

Figure 16:
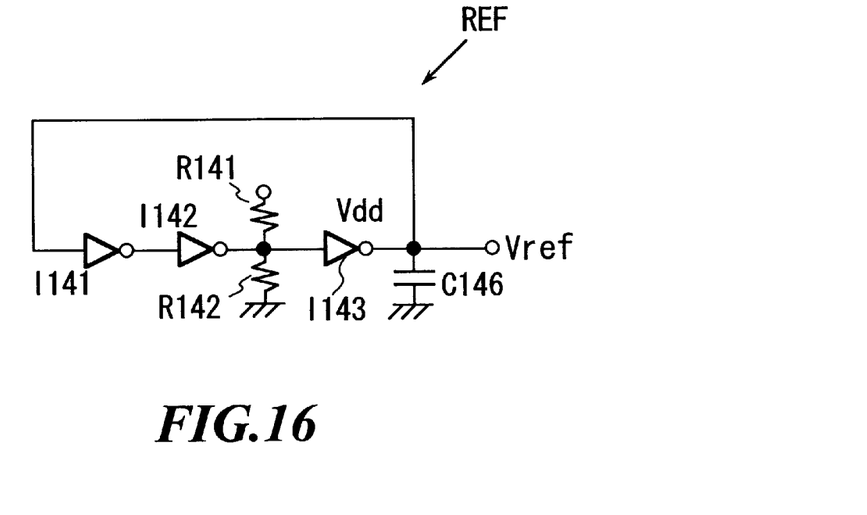
FIG. 16 is a schematic diagram of the reference voltage generator REF of FIG. 10.

FIG. 16 shows an example of a reference voltage generator REF, which generates the reference voltage Vref. The reference voltage generator REF feeds back the output of the last stage of the three-stage set of MOS inverters I141, I142 and I143 connected in series to the first stage input. Similar to the adder ADD91, the ground capacitor C146 and the balance resistors R141 and R142 prevent oscillation.

The output of the reference voltage generator REF stabilizes to a point in which the input and output voltage are equal. The desired reference voltage is obtained by setting thresholds of each MOS inverter. Generally, the reference voltage Vref is set as Vref=Vdd/2, to keep sufficient dynamic ranges in both positive and negative directions. Here, Vdd is the power source level of the MOS inverters.

As indicated above, the present invention holds a receiving signal in analog sample holders. Multiplexers divide these signals into a sequence of +1 or −1 value, substantially realizing the multiplication. A large scale of multiplication and integration are performed in a small circuit with a little energy consumption.

Despite having a plurality of matched filters, the total circuits are small enough for practical purposes and the energy consumption is kept to a minimum. Moreover, the spread spectrum communication method of the present invention transmits 4-bit information per symbol, which is 4-times faster than the ordinary transmission.

In the spread spectrum communication method of the present invention, digital data to be transmitted is divided into first through fourth elements respectively. A combination of the first and the second elements and the combination of the previously defined first and second PN codes are set based on the third and fourth elements. Thus, the present invention achieves outstanding speed with a minimum amount of circuitry.

Although the present invention was explained in accordance with the preferred embodiment, many modifications can be made to the embodiment without departing from the scope of the present invention. Therefore, the scope of the invention is not limited by those embodiments as is clear from the following claims.

What is claimed is:

1. A spread spectrum communication system comprising a first communications station having a transmitter and a second communications station having a receiver, wherein, the transmitter includes first and second PN codes; means for dividing data to be transmitted into frames having four bits; means for separating the four bits of each frame into first, second, third and fourth elements; a multiplier unit which spreads a spectrum of the data to be transmitted, by multiplying a first complex data unit defined by the first and second elements, by a second complex data unit defined by a combination of the first and second PN codes to produce multiplied data, the combination being defined by the third and fourth elements; and a quadrature modulator which modulates real and imaginary parts of the multiplied data; and the receiver comprises the first and second PN codes; a quadrature detector which detects in-phase and quadrature phase parts of a received signal; matched filters which despread the in-phase and quadrature phase parts of the received signal with the first and second PN codes, respectively; and a decoder which generates the first, second, third and fourth elements by processing outputs from the matched filters.

2. The spread spectrum communication system according to claim 1, wherein, the multiplier unit calculates (Ii+jIq) (Cx+jCy) wherein Ii is a value of the first element, Iq is a value of the second element, Cx+jCy is defined by the combination of the first and second PN codes;

the quadrature modulator modulates the real and imaginary parts of the multiplied data as in-phase and quadrature phase parts;

the matched filters despread the in-phase and quadrature phase parts of the received signal with all combinations of the first and second PN codes; and the system includes four of said matched filters.

3. The spread spectrum communication system according to claim 2, wherein the four matched filters include a first matched filter for applying the first PN code to a real part of the received signal, a second matched filter for applying the second PN code to a real part of the received signal, a third matched filter for applying the first PN code to the imaginary part of the received signal, and a fourth matched filter for applying the second PN code to the imaginary part of the received signal, and further comprising an operation unit which includes:

a first operator which performs an addition and a subtraction among outputs from the first and third matched filters; a second operator which performs an addition among outputs from the first and fourth matched filters and a subtraction among the outputs from the third and second matched filters; a third operator which performs an addition and a subtraction among the outputs from the second and fourth matched filters; a fourth operator which performs an addition among outputs from the second and third matched filters and a subtraction among outputs from the fourth and first matched filters; a level detector which detects output levels of the first, second, third, and fourth operators; a selector for selecting one of the operators based on which has a largest output level; and means for generating the first through fourth elements based on the largest output.

4. The spread spectrum communication system according to claim 3, wherein at least one of the matched filters of the receiver comprises:

sample holders, each of the sample holders having a switch, a first capacitor and a first inverter connected in series, the switch being connected to the received signal, the first inverter having an odd number of MOS inverters and a first feedback capacitor feeding an output of the first inverter to an input thereof;

a second multiplier having first and second multiplexers, the first multiplexer being arranged so as to select between an output signal from the sample holder and a reference signal, and the second multiplexer selects being arranged so as to select another signal, based on the first and second PN codes of the receiver;

an adder having a second capacitor connected to an output from the first multiplexer, a second inverter having an odd number of MOS inverters and connected to an output from the second capacitor, a second feed back capacitor feeding an output from the second inverter to an input thereof, a third capacitor connected to an output signal from the second multiplexer and to the output from the second inverter, a third inverter having an odd number of MOS inverters and being connected to the third capacitor, and a third feed back capacitor feeding an output from the third inverter to an input thereof; and a controller for closing one switch of the sample holders, while opening all other switches of the sample holders, and for switching the first and second multiplexers of the sample holders based on the PN codes of the receiver.

5. The spread spectrum communication system according to claim 4, comprising two groups of the sample holders, wherein:

one group of the sample holders have outputs connected to two of the second multipliers operating on an in-phase component of the received signal; and another group have outputs connected to another two of the second multipliers operating on a quadrature component of the received signal.

6. A spread spectrum communication station having a transmitter for transmitting a spread spectrum signal, a receiver for receiving a spread spectrum signal, and means for storing first and second PN codes wherein, the transmitter includes means for dividing data to be transmitted into frames having four bits; means for separating the four bits of each frame into first, second, third and fourth elements; a multiplier unit which spreads a spectrum of the data to be transmitted, by multiplying a first complex data unit defined by the first and second elements, by a second complex data unit defined by a combination of the first and second PN codes to produce multiplied data, the combination being defined by the third and fourth elements; and a quadrature modulator which modulates real and imaginary parts of the multiplied data; and the receiver comprises a quadrature detector which detects in-phase and quadrature phase components of a received signal; matched filters which despread the in-phase and phase components of the received signal with the first and second PN codes, respectively; and a decoder which generates the first, second, third and fourth elements by processing outputs from the matched filters.

7. The spread spectrum communication station according to claim 6, wherein, the multiplier unit calculates (Ii+jIq) (Cx+jCy) wherein Ii is a value of the first element, Iq is a value of the second element, Cx+jCy is defined by the combination of the first and second PN codes;

the quadrature modulator modulates the real and imaginary parts of the multiplied data as in-phase and quadrature phase signals; and the matched filters despread the in-phase and quadrature phase components of the received signal with all combinations of the first and second PN codes; and station includes four of the matched filters.

8. The spread spectrum communication station according to claim 7, wherein:

the matched filters include a first matched filter for applying the first PN code to the in-phase component of the received signal; a second matched filter for applying the second PN code to the in-phase component; a third matched filter for applying the first PN code to the quadrature component; and a fourth matched filter for applying the second PN code to the quadrature component; and the decoder includes:

a first operator which performs an addition and a subtraction among outputs from the first and third matched filters; a second operator which performs an addition among outputs from the first and fourth matched filters and a subtraction among the outputs from the third and second matched filters; a third operator which performs an addition and a subtraction among the outputs from the second and fourth matched filters; a fourth operator which performs an addition among outputs from the second and third matched filters and a subtraction among outputs from the fourth and first matched filters; a level detector which detects output levels from the first, second, third and fourth operators; a selector for selecting one of said operators based on which has a largest output level; and means for generating the first, second, third and fourth elements based on the largest output.

9. The spread spectrum communication station according to claim 8, wherein at least one of the matched filters of the receiver comprises:

sample holders, each of the sample holders having a switch, a first capacitor and a first inverter connected in series, the switch being connected to the received signal, the first inverter having an odd number of MOS inverters and a first feedback capacitor feeding an output of the first inverter to an input thereof;

a second multiplier having first and second multiplexers, the first multiplexer being arranged so as to select between an output signal from the sample holder and a reference signal, the second multiplexer being arranged so as to select another signal, based on the first and second PN codes of the receiver;

an adder having a second capacitor connected to an output from the first multiplexer, a second inverter having an odd number of MOS inverters and connected to an output from the second capacitor, a second feed back capacitor feeding an output from the second inverter to an input thereof, a third capacitor connected to an output from the second multiplexer and to the output from the second inverter, a third inverter having an odd number of MOS inverters and being connected to the third capacitor, and a third feed back capacitor feeding an output from the third inverter to an input thereof; and a controller for closing one switch of the sample holders, while opening all other switches of the sample holders, and for switching the first and second multiplexers of the sample holders based on the PN codes of the receiver.

10. The spread spectrum communication station according to claim 9, comprising two groups of the sample holders, wherein:

one group of the sample holders have outputs connected to two of the second multipliers operating on the in-phase component of the received signal; and another group have outputs connected to another two of the second multiplier operating on the quadrature component of the received signal.

11. A spread spectrum communication station comprising a transmitter, wherein the transmitter has:

first and second PN codes;

means for dividing data to be transmitted, into frames having four bits;

means for separating the four bits of the frame into first, second, third and fourth elements;

a multiplier unit which spreads a spectrum of the data to be transmitted, by multiplying a first complex data unit defined by the first and second elements, by a second complex data unit defined by a combination of the first and second PN codes to produce multiplied data;

the combination being defined by the third and fourth elements; and a quadrature modulator which modulates real and imaginary parts of the multiplied data.

12. The spread spectrum communication station according to claim 11, wherein, the multiplier unit calculates (Ii+jIq) (Cx+jCy) wherein Ii is a value of the first element, Iq is a value of the second element, Cx+jCy is defined by the combination of the first and second PN codes; and the quadrature modulator modulates the real and imaginary parts of the multiplied data as in-phase and quadrature phase signals.

13. A spread spectrum communication station comprising a receiver, wherein the receiver includes:

a quadrature detector which detects in-phase and quadrature phase components of a received signal;

matched filters which despread the in-phase and quadrature phase components of the received signal with first and second PN codes;

wherein the matched filters include a first matched filter for applying the first PN code to the in-phase component; a second matched filter for applying the second PN code to the in-phase component; a third matched filter for applying the first PN code to the quadrature phase component; and a fourth matched filter for applying the second PN code to the quadrature phase component; and a decoder which generates first, second, third, and fourth elements by processing outputs of the matched filters.

14. The spread spectrum communication station according to claim 13, wherein:

the decoder includes a first operator which performs an addition and a subtraction among outputs from the first and third matched filters; a second operator which performs an addition among outputs from the first and fourth matched filters and a subtraction among the outputs from the third and second matched filters; a third operator which performs an addition and a subtraction among the outputs from the second and fourth matched filters; a fourth operator which performs an addition among outputs from the second and third matched filters and a subtraction among outputs from the fourth and first matched filters; four level detectors which detect output levels from the first, second, third and fourth operators; a selector for selecting one of the operators based on which has a largest output level; and means for generating first, second, third and fourth elements based on the largest output.

15. The spread spectrum communication station according to claim 14, wherein at least one of the matched filters comprises:

sample holders, each of the sample holders having a switch, a first capacitor and a first inverter connected in series, the switch being connected to the received signal, the first inverter having an odd number of MOS inverters and a first feedback capacitor feeding an output of the first inverter to an input thereof;

a second multiplier having first and second multiplexers, the first multiplexer being arranged so as to select between an output signal from the sample holder and a reference signal, the second multiplexer being arranged so as to select another signal, based on the first and second PN codes of the receiver;

an adder having a second capacitor connected to an output from the first multiplexer, a second inverter having an odd number of MOS inverters connected to an output from the second capacitor, a second feed back capacitor feeding an output from the second inverter to an input thereof, a third capacitor connected to an output signal from the second multiplexer and to the output from the second inverter, a third inverter having an odd number of MOS inverters and being connected to the third capacitor, and a third feed back capacitor feeding an output from the third inverter to an input thereof; and a controller for closing one switch of the sample holders, while opening all the other switches of the sample holders, and for switching the first and second multiplexers behind the sample holders based on the PN codes of the receiver.

16. The spread spectrum communication station according to claim 15, comprising two groups of the sample holders, wherein:

one group of the sample holders have outputs connected to two of the second multipliers operating on the in-phase component of the received signal; and another group have outputs connected to two of the second multipliers operating on the quadrature component of the received signal.

* * * * *